United States Patent
Crosby (10) Patent No.: US 10,271,326 B2
(45) Date of Patent: Apr. 23, 2019

(54) SCHEDULING FUNCTION CALLS

(71) Applicant: ARM IP LIMITED, Cambridge (GB)

(72) Inventor: James Crosby, Cambridge (GB)

(73) Assignee: ARM IP Limited, Cambridge (GB)

( * ) Notice: Subject to any disclaimer, the term of this patent is extended or adjusted under 35 U.S.C. 154(b) by 66 days.

(21) Appl. No.: 15/027,241

(22) PCT Filed: Oct. 7, 2014

(86) PCT No.: PCT/GB2014/053014
§ 371 (c)(1),
(2) Date: Apr. 4, 2016

(87) PCT Pub. No.: WO2015/052501
PCT Pub. Date: Apr. 16, 2015

(65) Prior Publication Data
US 2016/0249354 A1    Aug. 25, 2016

(30) Foreign Application Priority Data

Oct. 8, 2013 (GB) .................................. 1317753.0

(51) Int. Cl.
| | |
|---|---|
| H04W 72/04 | (2009.01) |
| G06F 9/48 | (2006.01) |
| H04B 1/3827 | (2015.01) |
| H04L 12/861 | (2013.01) |
| H04W 72/12 | (2009.01) |

(52) U.S. Cl.
CPC ...... H04W 72/0446 (2013.01); G06F 9/4881 (2013.01); H04B 1/385 (2013.01); H04L 49/90 (2013.01); H04W 72/1242 (2013.01); Y02D 10/24 (2018.01)

(58) Field of Classification Search
CPC .......... H04W 72/044; H04W 72/0446; H04W 72/1242; H04W 72/1247; G06F 9/4881; G06F 9/4887; H04B 1/385; H04L 49/90; H04L 49/9005; Y02B 60/144
See application file for complete search history.

(56) References Cited

U.S. PATENT DOCUMENTS 5,487,170 A * 1/1996 Bass ..................... G06F 13/364
370/461
5,630,128 A * 5/1997 Farrell .................. G06F 9/4881
718/103

(Continued)

FOREIGN PATENT DOCUMENTS

WO    WO 2006/115611 A2    11/2006

OTHER PUBLICATIONS

PCT International Preliminary Report on Patentability for PCT/GB2014/051175, dated Nov. 10, 2016, 12 pages.

(Continued)

*Primary Examiner* — Kevin D Mew
(74) *Attorney, Agent, or Firm* — Patterson Thuente Pedersen, P.A.

(57) ABSTRACT

A data processing apparatus has a scheduler which maintains a queue of function calls to be scheduled for processing by processing circuitry. The scheduler identifies, for every function call in the queue, a target time window within which the processing circuitry should process the function call. The scheduler schedules processing of the function calls based on the target time window.

22 Claims, 5 Drawing Sheets

(56) References Cited

U.S. PATENT DOCUMENTS

| | | | |
|---|---|---|---|
| 6,011,798 A * | 1/2000 | McAlpine | H04L 12/5601 370/395.42 |
| 6,757,897 B1 * | 6/2004 | Shi | G06F 9/4843 710/240 |
| 6,948,172 B1 * | 9/2005 | D'Souza | G06F 9/4881 718/106 |
| 7,777,719 B2 * | 8/2010 | Zhao | G06F 3/011 345/156 |
| 7,877,748 B2 * | 1/2011 | Kwiat | G06F 9/4887 718/100 |
| 9,014,640 B2 * | 4/2015 | Krishnaswamy | G06F 1/3203 455/572 |
| 9,304,815 B1 * | 4/2016 | Vasanth | G06F 9/4881 |
| 2003/0021228 A1 * | 1/2003 | Nakano | G06F 9/4881 370/229 |
| 2003/0037237 A1 | 2/2003 | Abgrall et al. | |
| 2003/0191661 A1 * | 10/2003 | Doyle | G06Q 10/10 705/35 |
| 2004/0205206 A1 * | 10/2004 | Naik | H04L 29/06 709/230 |
| 2005/0114858 A1 * | 5/2005 | Miller | G06F 9/485 718/100 |
| 2007/0074150 A1 * | 3/2007 | Jolfaei | G06F 9/4881 717/103 |
| 2008/0127341 A1 * | 5/2008 | Chen | G06F 11/3608 726/22 |
| 2009/0007123 A1 * | 1/2009 | Sreedharan | G06F 9/4887 718/103 |
| 2009/0089790 A1 | 4/2009 | Manczak et al. | |
| 2009/0106754 A1 | 4/2009 | Liu et al. | |
| 2009/0254774 A1 * | 10/2009 | Chamdani | G06F 9/4881 714/2 |
| 2009/0281835 A1 * | 11/2009 | Patwardhan | G06F 19/3406 705/3 |
| 2009/0320047 A1 * | 12/2009 | Khan | G06F 9/542 719/318 |
| 2009/0320048 A1 | 12/2009 | Watt et al. | |
| 2009/0328058 A1 | 12/2009 | Papaefstathiou et al. | |
| 2010/0011344 A1 | 1/2010 | Guterman | |
| 2011/0161964 A1 * | 6/2011 | Piazza | G06F 9/4881 718/102 |
| 2011/0179252 A1 * | 7/2011 | Master | G06F 15/17362 712/30 |
| 2011/0222552 A1 * | 9/2011 | Mital | G06F 9/3851 370/412 |
| 2011/0225589 A1 * | 9/2011 | Pirog | G06F 9/3851 718/102 |
| 2012/0167101 A1 * | 6/2012 | Kandula | H04L 67/325 718/102 |
| 2012/0192198 A1 * | 7/2012 | Becchi | G06F 12/0284 718/104 |
| 2014/0344820 A1 * | 11/2014 | Kumar | G06F 9/4843 718/103 |
| 2016/0232032 A1 * | 8/2016 | Azvine | G06F 9/542 |
| 2017/0039085 A1 | 2/2017 | Meriac et al. | |

OTHER PUBLICATIONS

International Search Report for PCT/GB2015/051175, dated Nov. 3, 2015, 6 pages.
Written Opinion for PCT/GB2015/051175, dated Nov. 3, 2015, 10 pages.
GB Search Report for GB1407409.0, dated Nov. 11, 2014, 3 pages.
Application and File history for U.S. Appl. No. 15/304,302, filed Apr. 20, 2015. Inventors: Meriac et al.
Garfinkel, T.: "Terra: a virtual machine-based platform for trusted computing", ACM SOSP. Proceeding of the ACM Symposium on Operating Systems Principles; Oct. 19, 2003, Dec. 2003 (Dec. 2003), pp. 193-206, XP002340992.
Gabber et al., "The Pebble Component-Based Operating System", Proceedings of the USENIX Technical Conference, 1999. Available from www.usenix.org/events/usenix99/full_papers/gabber/gabber.pdf [Accessed Nov. 6, 2014], 33 pages.
International Search Report for PCT/GB2014/053014, dated Dec. 16, 2014, 2 pages.
PCT Written Opinion of the International Searching Authority for PCT/GB2014/053014, dated Dec. 16, 2014, 6 pages.

* cited by examiner

| queue | fn | pointer | arguments | preferred time | tolerance | expected duration |
|---|---|---|---|---|---|---|
| | fn 0 | | | $t_0$ | ± 2ms | 10ms |
| 40 | fn 1 | | | $t_1$ | ± 1s | 30ms |
| | fn 2 | | | $t_2$ | ± 20ms | 5ms |
| | . | | | . | . | . |

SCHEDULING FUNCTION CALLS

RELATED APPLICATIONS

The present application is a National Phase entry of PCT Application No. PCT/GB2014/053014, filed Oct. 7, 2014, which claims priority from GB Patent Application No. 1317753.0, filed Oct. 8, 2013, said applications being hereby incorporated by reference herein in their entirety.

TECHNICAL FIELD

The present invention relates to the field of data processing. More particularly, the invention relates to scheduling function calls for processing by processing circuitry.

BACKGROUND ART

Function calls may be used to trigger processing circuitry to perform a corresponding function. There may be various competing sources of function calls, such as applications or interrupt handlers, and it may not be possible to handle all of the function calls right away. Therefore, a scheduler may be provided to schedule which function calls are processed when by the processing circuitry. Such schedulers often use a prioritization scheme in which each function call has an associated priority, and the scheduler determines which function calls should be processed first based on the priority of each function call. Some schedulers allow additional information to be defined for a function call. For example, it is possible to define a window of time in which the processing circuitry should process the function call, and the scheduler can then aim to schedule the function call so that it is processed within this window. However, the window information is regarded merely as a secondary hint for assisting with the primary scheduling mechanism based on the function priorities. While the window information may optionally be provided, not all function calls are provided with this information. The priority-based scheduling mechanism takes precedence.

SUMMARY

Viewed from one aspect, the present invention provides embodiments of a data processing apparatus comprising:
processing circuitry; and
a scheduler configured to maintain a queue of function calls to be scheduled for processing by the processing circuitry;
wherein the scheduler is configured to identify, for every function call in the queue, a target time window within which the processing circuitry should process the function call; and
the scheduler is configured to schedule processing of the function calls by the processing circuitry based on the target time window identified for the function calls in the queue.

The scheduler of the present technique differs from prior art schedulers in that every function call in a queue of function calls to be scheduled for processing by the processing circuitry has an associated target time window within which the processing circuitry should process the function call. This is different to previous schedulers where at most only some function calls have a target time window. Hence, for each function call in the queue, the scheduler can identify the target time window, and then schedule processing of the function calls by the processing circuitry based on the target time window identified for the function calls in the queue.

By defining a target time window for every function call in the queue, the target time window can then be used as the primary scheduling mechanism, rather than a mere secondary hint. This is useful because, unlike priority information, the target time window provides scheduling information which can be used for scheduling both when processor utilization is high (for prioritizing between different function calls) and when processor utilization is low (for deciding how to schedule function calls to improve energy efficiency). This approach is counter intuitive since the target time window information has typically been regarded as an optional additional annotation rather than a primary scheduling mechanism in its own right. Also, unlike some previous systems which have specific modes which prioritize different sorts of function calls, the present technique provides an improved scheduling mechanism because it may cope flexibly with a greater variety of circumstances than just a limited set of modes, and because it allows for a simpler application programming interface (API), which governs how software components interact with each other.

The scheduler can infer a priority of a function call from the target time window identified for the function call. For example, if a particular function call is associated with a long target time window, indicating that it is acceptable to process the function call at any time during a long time period, then this function call can be determined to be of relatively low priority. Conversely, a function call associated with a narrow time window can be considered to have higher priority. Therefore, the target time window can implicitly indicate the priority of function calls, so that it is not necessary to provide an explicit priority indication for each function call. This reduces the amount of information that needs to be provided by applications for characterising the function calls to the scheduler, and so simplifies development of applications. An application developer may only need to specify the target time window for a function call rather than defining multiple pieces of scheduling information as is common in previous scheduling schemes.

While the scheduler may aim to schedule each function call for processing within its corresponding target time window, in practice this may not be possible as there may be more function calls to be processed within a given time frame than can be handled using the available processing capacity of the processing circuitry. Therefore, the scheduler may prioritize between function calls based on the target time window identified for the function calls in the queue. For example, if there are multiple candidate function calls competing for processing by the processing circuitry, then the scheduler may for example prioritize the function call whose target time window is due to expire sooner ahead of other function calls with later expiring time windows. In other examples, the prioritization may be based on inferred priority values inferred from the target time windows.

The scheduler may also use the target time window to determine an order in which the function calls in the queue are processed by the processing circuitry. In contrast, in previous scheduling systems a priority indication would usually be used to determine the processing order of the function calls.

For example, there may be a group of function calls which cannot all be processed within their respective target time windows. In this case, the scheduler may determine which of the group of calls should be processed outside its target time window based on the target time window identified for each function call of the group of function calls. For example, one or more function calls with the longest target time windows could be processed later than other function calls with a shorter target time window.

In another example, the scheduler may determine a lateness metric for the group of function calls which depends on the "lateness" of each function in the group (the lateness represents the amount of time by which the function call is processed outside its target time window). The scheduler may then reorder the group of function calls to improve the lateness metric. The lateness metric may for example be a simple function such as the sum of the individual latenesses of each function call. Alternatively, the lateness metric may be a more complicated function of the individual latenesses of each function call in the group, such as a non-linear function of the latenesses, or a weighted average or sum of the latenesses with different types of function calls or function calls from particular sources being allocated greater weight than other function calls for example. In general the lateness metric may be any function of individual lateness functions for each call within the group. The improvement of the lateness metric may comprise any optimization of the lateness metric as the function calls are processed in different orders. For example, if the lateness metric gets smaller in value as the overall lateness decreases, then the scheduler may attempt to reorder the function calls to minimize (or at least reduce) the lateness metric. Alternatively, the lateness metric may have a value which increases as more of the function calls are processed closer to their time window, and in this case then the improvement of the lateness metric may comprise a maximization (or at least an increase) of the lateness metric.

The prioritization and reordering of the function calls discussed above is most useful when processor utilization is high. When the processor is relatively busy, it is more likely that the processor cannot handle all function calls within their respective target time windows, and in this case, it is useful to perform prioritization or reordering based on the target time window to improve lateness, and hence processing performance. The target time window identified for each function call helps the scheduler determine which are the most important functions to process first.

On the other hand, when processor utilization is low, then the target time window can be useful to improve energy efficiency. If the processor has to process a number of function calls which are spread over a period of time, then it may be more efficient for those function calls to be coalesced so that they are processed one after the other, rather than having some inactive periods in between processing the function calls. By coalescing at least two function calls, it is possible to reduce an overall time for which the processor is active, and/or to reduce an overall measure of energy consumption by the processing circuitry. The scheduler may determine whether, if at least two function calls were coalesced, each of the function calls could still be processed within their respective target time windows. If this is possible, then the scheduler may coalesce the function calls to save energy (for example, by reducing processor idle time or the number of times the processor switches between an active mode and sleep mode).

Hence, the same target time window information provides useful scheduling information both when processor utilization is high (for prioritization and reordering of function calls), and when utilization is low (when the time window information can be used to decide whether to coalesce function calls to save energy). This is not possible with priority information since the priority information does not provide any information about whether coalescing is acceptable (the priority information does not give any indication of whether it is allowable for the function calls to be processed earlier or later than the preferred time).

There are many ways in which a scheduler may identify the target time window for each function call in the queue. For example, the scheduler may identify the target time window based on window defining information associated with the function call. The window defining information may come from various sources. For example, the caller making the function call (such as a software application, an interrupt handling routine or a software library) may provide the window defining information along with the function call to indicate to the scheduler the period of time within which the function call should preferably be processed.

Alternatively, window defining information for particular function calls may be registered in advance with the scheduler, and when a function call is received then the scheduler may look up the stored information to identify the window defining information for the function call.

The window defining information may represent the time window in different ways. In one example, the window defining information may comprise a window end time which represents the latest time at which it is acceptable for the processing circuitry to process the function call. A window start time may not be necessary or may be considered implicit. For example, if there is no explicit indication of a window start time then the window start time can be determined to be the time at which the function call is received.

Alternatively, a window start time may also be defined in the window defining information to indicate the earliest time at which it is acceptable for the processing circuitry to process the function call. In this case, the scheduler will aim to schedule the function call to be processed between the window start time and the window end time.

Another way of representing the target time window may be to provide window defining information comprising a target processing time, which represents a preferred time at which the processing circuitry should process the function call, and tolerance information representing a tolerance before or after the target processing time within which it is acceptable for the processing circuitry to process the function call. The tolerance information may be symmetric, defining the same margin of time before and after the target processing time. Alternatively, asymmetric tolerance information may be provided where separate values are provided indicating the amount of time earlier and later than the target processing time at which it is acceptable to process the function call.

The target time window may be expressed in terms of absolute time (e.g. in units of microseconds) or in terms of number of processing cycles or another indirect indication of time.

In another example, the window defining information may indicate a particular class or type of function call and the target time window may then be determined based on the class or type. Hence, it is not necessary for the window defining information to explicitly indicate a time period, and instead the time window can be inferred from the type of function call or another property of the function call.

For some function calls, at the point when they reach the scheduler, there may be not any associated window defining information. For such function calls, the scheduler may set a time window itself, to ensure that each function call in the queue has a window defined. For example, the scheduler may assume a default time window for any function calls which do not have a time window already set. Alternatively, the scheduler may determine the target time window for the function based on the type of call or some other property of the function call, with different default windows selected for different categories of function calls. In another example, the target time window may be determined for example based on the expected processing time required to process the function call. For example, function calls whose processing is expected to last a short time may be provided with a shorter time window than function calls whose processing is expected to last longer.

In some examples, the target time window may be a window in which the scheduler should aim to control the processor to start processing the function call, in which case it may be acceptable for the processing of the function call to be completed outside the target time window. In other embodiments, the target time window may be a target window for completing the function call, not just starting the function call, in which case scheduling the function call may consider the expected length of time required to complete the function call when determining when it should be processed. The expected processing time may be estimated or monitored based on previous instances of the same function call. Hence, there are different ways of using the target time window to schedule the function calls.

In some examples, the scheduler may maintain multiple queues of function calls to be scheduled for processing by the processing circuitry. For example, different queues may be provided for different types of function calls. The scheduling based on the target time window may be performed for only one or some of the multiple queues, or for all queues. Hence it is not necessary for all of the queues to provide every function call with a target time window.

In some examples, the processing circuitry may include multiple processors. For example, the processing circuitry may comprise a multi-core processor or a general purpose processor in combination with a graphics processor. In some examples, each processor may have its own queue of function calls. However, more efficient scheduling may be possible if the queue of function calls maintained by the scheduler includes function calls for different processors.

Although a hardware scheduler may be provided, in many embodiments, the scheduler may be implemented as software executed by the processing circuitry. For example, the scheduler may be part of an operating system executed by the processing circuitry.

The scheduler need not be the only scheduling mechanism within the data processing apparatus. For example, the scheduler may receive function calls which have already been selected for processing by an earlier scheduling stage. Also, the scheduler itself may feed into a subsequent scheduling stage. For example, scheduling decisions made by the scheduler may determine when function calls are passed to a further scheduling mechanism which then decides which function calls are actually processed by the processing circuitry. Hence, the function calls determined for processing by the scheduler need not actually be processed at those times by the processing circuitry as a subsequent scheduling mechanism (such as a hypervisor for example) may intervene.

The present technique may be implemented in any type of data processing system requiring scheduling of function calls. However, as the target time window information is useful for scheduling both at high processor utilization and at low processor utilization, the present technique is particularly useful for systems expected to be fully active or almost fully active for some periods and also expected to be idle for significant periods of time. For example, there is an increasing use of wearable processing devices, such as a smart watch or jewelry having some processing capability. When such a device is being used by the user, then the processor may be busy and may have very little spare capacity. However, at other times when the user is wearing the device but not actively using it, the processor may be doing very little. For example, the watch may be doing nothing other than incrementing the displayed time once per minute. Therefore, there may be significant periods of low processor utilization, and so steps to improve energy efficiency may be useful. Hence, defining the target time window information for each queued function call is useful in both scenarios, and so the present technique is particularly suited to wearable processing devices.

Viewed from another aspect, embodiments of the present invention provide a data processing apparatus comprising:

processing means for performing data processing; and scheduling means for maintaining a queue of function calls to be scheduled for processing by the processing means;

wherein the scheduling means is configured to identify, for every function call in the queue, a target time window within which the processing means should process the function call; and the scheduling means is configured to schedule processing of the function calls by the processing means based on the target time window identified for the function calls in the queue.

Viewed from another aspect, embodiments of the present invention provide a function call scheduling method for a scheduler of a data processing apparatus, comprising steps of:

maintaining a queue of function calls to be scheduled for processing by processing circuitry;

identifying for every function call in the queue a target time window within which the processing circuitry should process the function call; and scheduling processing of the function calls by the processing circuitry based on the target time window identified for the function calls in the queue.

Further aspects, features, and advantages of the present technique will be apparent from the following detailed description, which is to be read in conjunction with the accompanying drawings.

DETAILED DESCRIPTION

Figure 1:
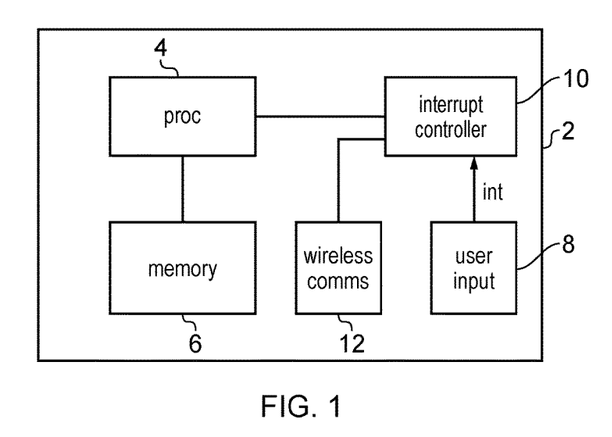
FIG. 1 schematically illustrates a data processing apparatus.

FIG. 1 schematically illustrates a data processing apparatus 2 comprising processing circuitry 4 for processing data. The processing circuitry 4 may comprise one processor core or multiple processor cores. The apparatus 2 has a memory 6 for storing data and instructions to be processed by the processor 4. A user input interface 8 is provided, for example including input buttons, a touch screen, or other input devices. An interrupt controller 10 is provided to receive interrupts and trigger corresponding interrupt handling to be processed by the processor 4. For example, when the user presses a button on the data processing apparatus 2, then an interrupt is triggered and the interrupt controller 10 triggers the processing circuitry 4 to perform a corresponding interrupt handling routine for carrying out some processing operations associated with the pressed button. The processing apparatus 2 also has an optional wireless communication unit 12 for communicating with other devices via wireless signals such as wireless local area network (Wi-Fi) or Bluetooth. It will be appreciated that the processing apparatus may also have other components which are not illustrated in FIG. 1 for conciseness.

Figure 2:
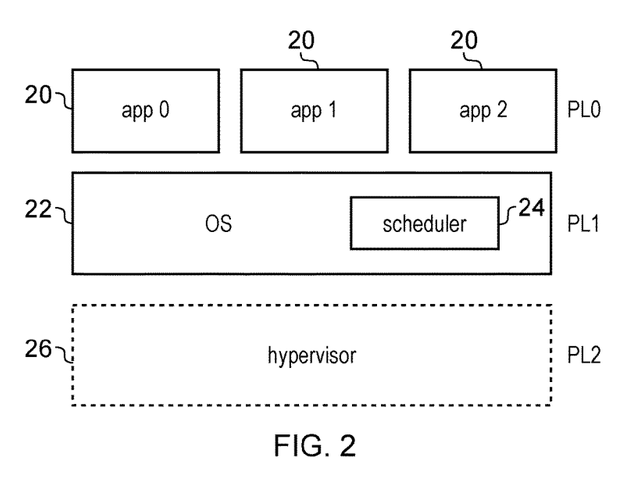
FIG. 2 schematically illustrates software layers supported by the processing apparatus.

FIG. 2 schematically illustrates an example of software layers which may be executed by the processing circuitry 4. The processing circuitry 4 executes a number of applications 20 which execute at a first privilege level PL0. An operating system 22 executing at a second privilege level PL1 manages the processing of the applications 20 by the processing circuitry 4. The operating system comprises a scheduler 24 for scheduling function calls to be processed by the processing circuitry 4. Optionally, the processor may execute multiple operating systems 22, and so a hypervisor 26 may be provided at a third privilege level PL2 for managing the guest operating systems. For example, scheduling decisions from the scheduler 24 in one of the operating systems 22 may be passed to the hypervisor 26 which then decides which function calls are actually handled by the processing circuitry 4.

Figure 3:
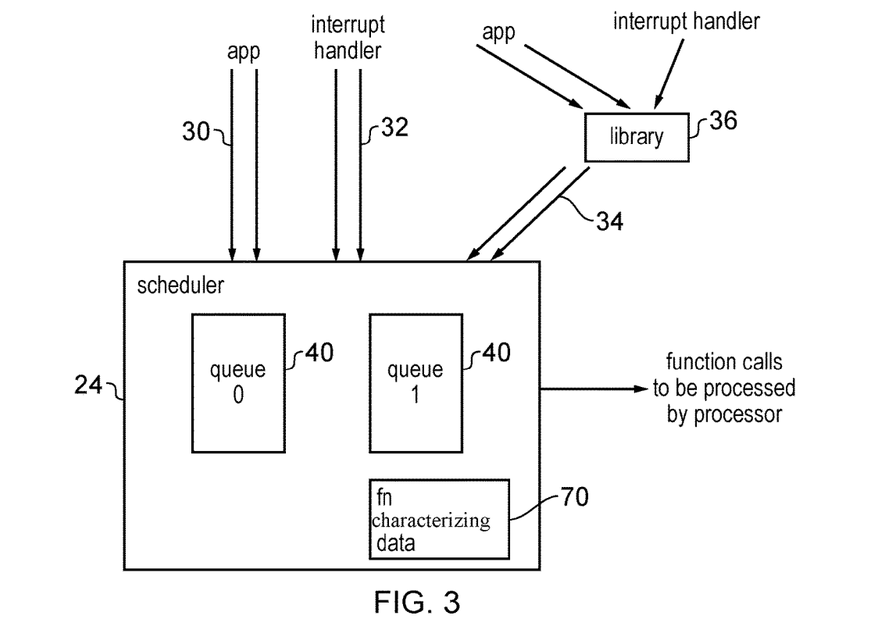
FIG. 3 schematically illustrates a scheduler for scheduling function calls to be executed by a processor.

FIG. 3 shows an example of the scheduler 24. While in FIG. 2 the scheduler 24 is part of the operating system 22, in other examples, the scheduler 24 may be provided in software other than the operating system 22, or in hardware. The scheduler 24 receives function calls from various sources. For example, the function calls may include direct function calls 30 received from applications 20 executed by the processing circuitry 4. Also, the function calls may include interrupt-triggered function calls 32 which are received from an interrupt handling routine. Hence, when the interrupt controller 10 receives an interrupt, it triggers a processing circuitry 4 to execute a corresponding interrupt handling routine, and this interrupt handling routine may include various function calls to direct the processing circuitry 4 to perform the required functions. The function calls received by the scheduler 24 may also include indirect function calls 34 which are not received directly from an application or an interrupt handler, but which instead proceed indirectly via a library 36 or other software mechanism which receives the function call and then calls the scheduler 24. The library 36 allows certain function calls to be translated or mapped to other function calls not supported by the caller software.

As shown in FIG. 3, the scheduler 24 may maintain one or more queues 40 of function calls. In this example, multiple queues 40 are provided, for example corresponding to different types of function calls or functional calls for processing by different processors. Alternatively a single queue 40 may be shared between processor cores. As function calls are received, then they are placed in one of the queues 40 and then the scheduler 24 determines, among the queued function calls, which function call should be processed when by the processing circuitry 4. Each scheduling decision may consider all the queued function calls when selecting the next function call to be processed, or may instead consider only a subset of the queued function calls at a time. For example, at each scheduling decision for selecting the next function call to be processed, the oldest ten function calls, or some other number of function calls, may be considered to simplify the scheduling decision, as it may for example be assumed that the best function call to be processed next is unlikely to be a more recently received function call. The scheduler 24 outputs to the processing circuitry 4 an indication of the function call(s) to be processed. For example, the function pointer and arguments may be sent to the processing circuitry 4.

Figure 4:
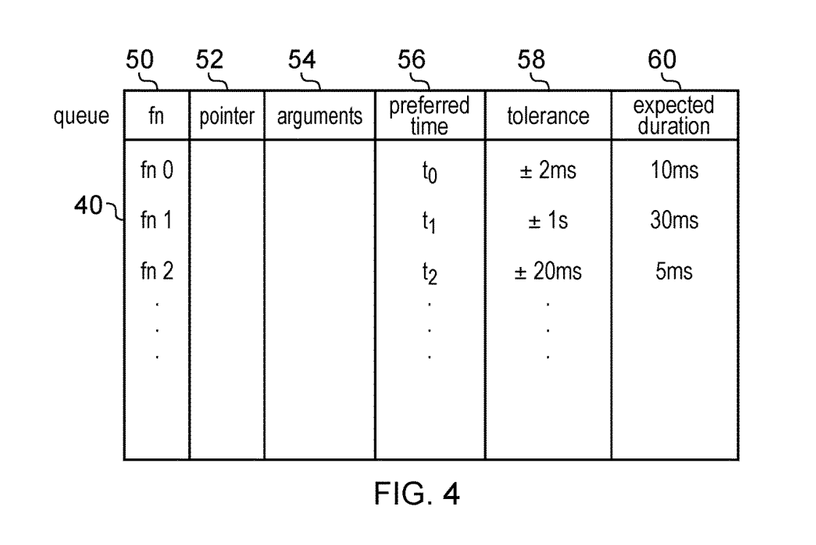
FIG. 4 illustrates an example of information maintained for a queue of function calls by the scheduler, including target time windows identified for each function call in the queue.

As shown in FIG. 4, the scheduler 24 may maintain various information about each function call in the queue 40. This information may be stored by the scheduler 24 as part of the queue 40 itself, or another data store associated with the queue 40. For example, the queue may maintain, for each function, an indication of the function name 50 by which the function will be called, a function pointer 52 indicating an address of an instruction to be processed in response to the function call, and optionally some function arguments 54 comprising zero one or more data values to be processed during the function. The function arguments 54 may be passed from the caller that made the function call. Not all functions may require function arguments 54. Also, the queue 40 may maintain various types of scheduling information for controlling when function calls are carried out. This information includes information identifying a target time window within which the function call is preferably scheduled for processing. In this example, the time window is defined using a target processing time 56 indicating a time at which the function call is preferably carried out, and a tolerance 58 indicating a margin outside of the preferred time at which it is acceptable to process the function call. For example, for function fn0 in FIG. 4, the target time window lasts from 2 milliseconds before the preferred time $t_0$ to 2 milliseconds after the preferred time $t_0$. In other examples, the target time window may be defined using a start time and an end time, or with an end time only with the start of the window being implicit so that the function can be processed at any time after it has been received by the scheduler 24. The tolerance 58 in FIG. 4 is shown as a symmetric tolerance where the same margin either side of the preferred time 56 is defined, but in other examples separate tolerances could be provided for defining the margin before and after the preferred time 56. The queue may also indicate an expected duration 60 for the function call, which can be estimated based on the amount of time taken to process a function on a previous iteration of the function.

The queue 40 may be represented in different ways. In some embodiments, the queue may be represented as a tree structure or linked list with a logical ordering. In other examples, the queue order may be represented with a physical ordering in memory 6. While FIG. 4 shows an example where function names 50 are allocated to each function, in other examples the functions may be identified by the function pointer 52 alone and may not have an associated name. Also, in some implementations the pointer 52 may be considered to be one of the arguments 54 for a function. The scheduler 24 may also in some examples maintain the time window information 58, 60 in a separate structure to other data about the function calls. For example, the time window information may be added to a sorted list of function windows, which may be implemented using a tree structure.

The scheduler 24 ensures that every function call in the queue 40 has an identified target time window. This may be implemented in different ways. For example the callers of functions may define the target time window information when they make a function call. Also, the scheduler 24 may have a function characterizing data store 70 which stores characterizing data for functions. The data store 70 may be part of the memory 6 or a separate set of registers or cache maintained for the scheduler 24. When a caller makes a function call having a given function name 50 then the scheduler 24 can look up the corresponding characterizing data 52, 54, 56, 58, 60 in the function characterizing data store 70. Hence, target time window information may be defined in advance for a function of a given name and looked up when required by the scheduler 24. Also, if a function call does not have a corresponding target time window already defined then the scheduler may determine a default time window for it, either based on a standard default time for all function calls or based on default times set for different types of function calls or for function calls of different durations. There may be many other ways in which the scheduler may identify a default time window for a function call.

Figure 5:
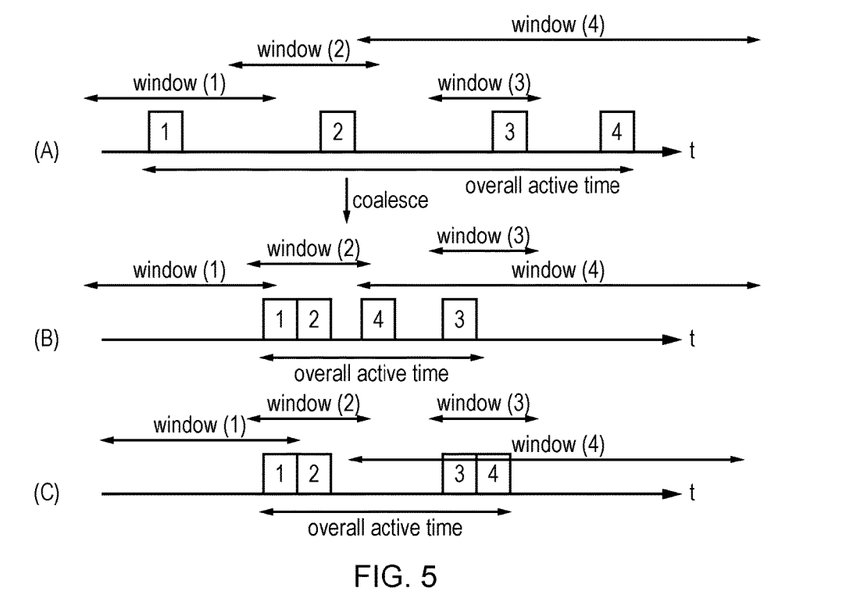
FIG. 5 schematically illustrates an example of coalescing function calls to reduce overall active time of a processor.
Figure 6:
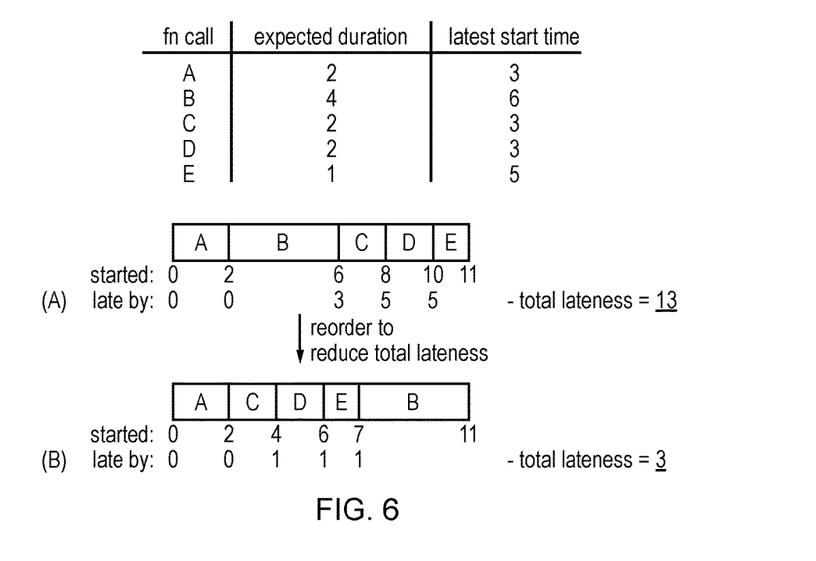
FIG. 6 schematically illustrates an example of reordering a group of function calls to reduce the extent by which the function calls are processed later than their target time windows.

By defining a target time window for every function call in the queue 40, the scheduler 24 is able to use this information as a primary scheduling mechanism for determining which functions to execute, making it unnecessary to define other types of scheduling information such as priority values. FIGS. 5 and 6 show two examples of scheduling techniques which can be performed using the target time window information. FIG. 5 shows an example of coalescing the function calls so that they are performed in a shorter overall time. This is useful when the processor utilization is low. Part (A) of FIG. 5 shows four function calls to be scheduled for processing, each with a corresponding target time window as illustrated by the "window" arrows. The scheduler 24 can determine based on the target time windows whether the function calls can be coalesced so that they are performed in a shorter time while still satisfying the windows for each function call. Hence, as shown in part (B) of FIG. 5, function call 1 can be shifted towards the end of its target time window, while function call 4 can be shifted towards the start of its window. Functions 2 and 3 can also be shifted slightly in time. By coalescing the function calls in this way, the overall time for which the processing is active can be reduced. This means that the processor does not need to remain in an active mode for as long, allowing greater use of a sleep mode to save energy. Also, in the situation shown in part (A), the processor might have returned to the sleep mode between each function call, and then woken up ahead of the following call. By coalescing the function calls as shown in part (B), the processor can remain active while processing all the function calls before then returning to the sleep mode and staying in the sleep mode for a longer period. As each transition between the active and sleep modes has an associated energy overhead, then reducing the number of mode transitions helps to reduce overall power consumption.

Part (C) of FIG. 5 shows another example of coalescing the function calls of part (A). After completing one function call, the scheduler may determine whether the following function call can be performed immediately after the previous function call. Hence, in part (C), after completing function call 1, function call 2 is performed next. Similarly, following the processing of function call 3, it is determined that function call 4 can be processed next while still being carried out within its target time window. This approach is described in more detail with respect to FIG. 9 below. By coalescing the calls in this way, the overall active time of the processor can be reduced.

FIG. 6 shows another scheduling example in which the target time window information is used to reorder function calls at a time of high utilization to reduce overall lateness. The table at the top of FIG. 6 shows an example of a group of five function calls A to E each with an associated expected duration time and a latest start time. The times are shown in integer values and may be in any units of time, such as micro-seconds, milliseconds or number of processing cycles.

Part (A) of FIG. 6 shows an example of the total lateness of these function calls if they are processed in the order A, B, C, D, E. The individual latenesses of each function call are calculated by subtracting their latest start time (representing the end of the target time window) from the time at which they are actually started if they were processed in a given order (the actual start time can be determined from the cumulative durations of all preceding functions). The total lateness is determined by adding the individual lateness of the functions. As shown in part (A) of FIG. 6, when the functions are processed in the order A, B, C, D, E then the total lateness is 13. As shown in part (B), if the function calls are reordered to be scheduled in the order A, C, D, E, B then the total lateness is reduced to 3. Hence by reordering the scheduler can reduce the overall lateness measure to improve performance. While FIG. 6 shows an example in which the lateness metric is a simple sum of the individual latenesses of each function call, in other examples a more complicated metric could be used which comprises any function derived from individual lateness functions for each function call. For example, lateness for individual functions could be weighted so that it is more important to satisfy the target time windows for some function calls than others. Also, more complicated functions than a simple indication of the time by which they overrun their target window can be used. Another example of a lateness metric may be calculated according to the following equation:

$$\text{lateness metric} = \sum_i \frac{\text{lateness}[i]}{1 + \text{window\_size}[i]}$$

where the sum is carried out over all late function calls i, lateness[i] represents the lateness of the corresponding function call i and, window_size[i] represents the length of the target time window of the corresponding function call i. This type of lateness metric is useful for encoding the way in which priority is inferred from the target time windows. In this example, the priority of the function call is inferred from the length of the target time window according to the relation (1/1+window size). This ensures that functions with a narrower time window are given a higher priority than functions with a wider time window for which there is more flexibility in scheduling. In general the scheduler may reorder the function calls to optimize the lateness metric.

Hence, FIGS. 5 and 6 show that the target time window information can be used both when processor utilization is low and when utilization is high to perform scheduling to achieve reduced power consumption and/or better servicing of the target time windows. In particular, the reordering based on the target time window of FIG. 6 is unusual since priority information would be normally used for this purpose. The present technique allows such priority information to be eliminated so that the application developers do not need to define both the priority and the target time window. The target time window alone is enough to provide useful scheduling information for a range of processor utilizations. This makes the application programming interface simpler.

Figure 7:
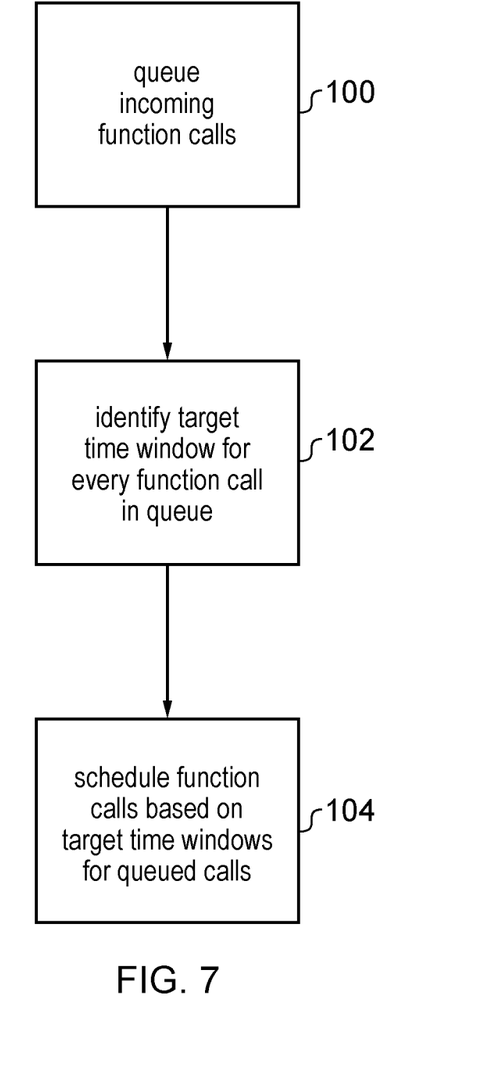
FIG. 7 schematically illustrates a method of scheduling function calls.

FIG. 7 shows an example method of scheduling function calls for processing by the processing circuitry. At step 100 the scheduler 24 queues incoming function calls in the queue 40. At step 102 the scheduler identifies the target time window for every function call in the queue 40. For example, as each function call is received, the corresponding time window may be identified based on the function characterizing data in the data store 70 or based on information provided by the function caller, or can be determined from default information as discussed above. At step 104 the scheduler then schedules the function calls for processing based on the target time windows defined for each of the queued calls. For example, the scheduling may include inferring priorities of function calls from the target time windows, prioritizing between the function calls based on the target time window, determining an order in which function calls are processed based on the target time window, scheduling timings at which the function calls are performed based on the target time window, and/or coalescing function calls dependent on their target time windows. It will be appreciated that many other uses of this information may be provided.

Figure 8:
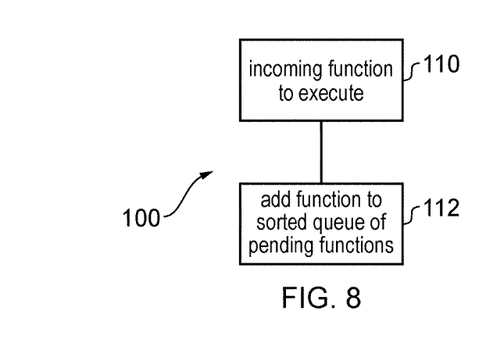
FIG. 8 illustrates a method of adding a function call to the queue.

FIG. 8 shows in more detail an example of the queuing at step 100 of FIG. 7. At step 110, a function call to be executed is detected by the scheduler 24. This may occur at any time. At step 112 the scheduler 24 adds the function call to a sorted queue of pending function calls. For example, data may be added to a function call list, which may be a tree structure or linked list for example. If the function call does not already have a time window defined for it, then the scheduler 24 may determine a time window.

Figure 9:
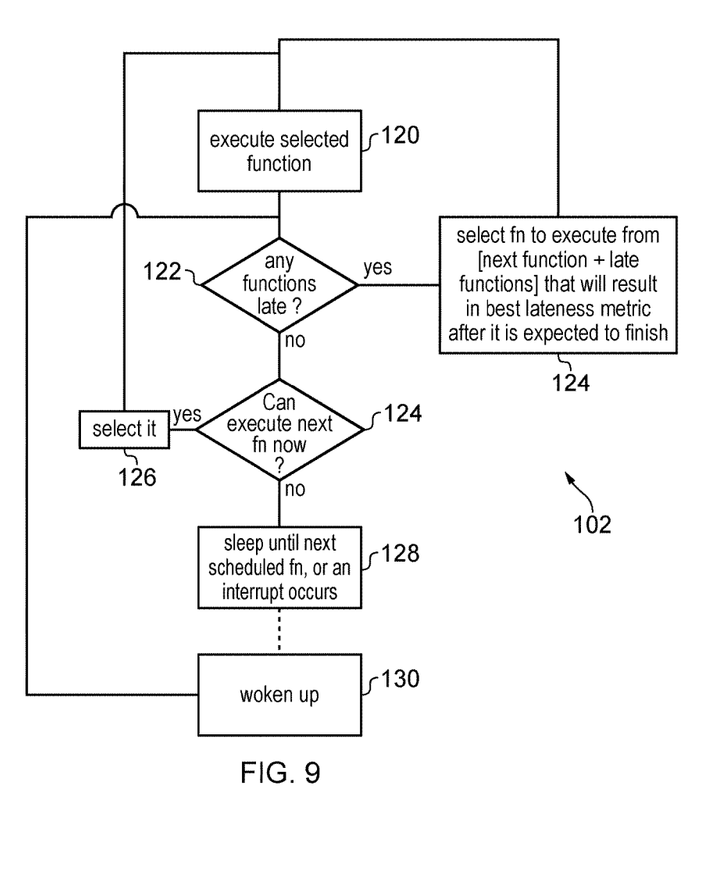
FIG. 9 illustrates an example of scheduling function calls based on target time windows.

FIG. 9 shows in more detail an example of scheduling the function calls based on the target time windows at step 104 of FIG. 7. In this example, each time a function call is executed, the scheduler 24 determines the next function call to be executed and when it should be executed. At step 120, a function call is executed. At step 122, the scheduler 24 determines whether there are any late function calls pending in the queue 40 (the late function calls being function calls for which the target time window has already expired).

If there is at least one late function call, then at step 124 the scheduler 24 selects a function to execute from the next function call (the function call following the function call executed at step 120) and any late functions. The scheduler selects the function call which will result in the best lateness metric at the expected end time of the function call. For example, as shown in the equation above, the lateness metric may be the sum of {(expected lateness of function i)/(1+ duration of time window for function i)} for all late functions. The function call may be selected to minimize the increase in lateness metric at the time when the function call is expected to finish. Sometimes, it may be better to select the next function call, rather than a late function call, as the next function call may have a tight time window indicating that it is more important to service the next function call than an already late function call with a longer time window. Following step 124, the method returns to step 120 where the selected function call is executed.

On the other hand, if at step 122 it is determined that there are no late functions pending in the queue 40, then at step 124 the scheduler 24 determines whether the next function call in the queue 40 can be executed now. The function call can be executed now if the current time is within the time window defined for that function call. If the next function call can be executed now, then it is selected at step 126 and executed at step 120. Hence, processing of the selected function call and next function call may be coalesced using steps 124, 126 if permitted by the target time window for the next function call. If the target time window indicates that the next function call cannot be executed now, then at step 128 the processing circuitry 4 is placed in sleep mode. At the time when the next function call is scheduled to be executed, or when an interrupt occurs, then the processing circuitry 4 is woken up and returns to an active mode at step 130. The method then returns to step 122 where it is again determined whether there are any late functions (for example, the interrupt triggering the wake up step 130 may require a function to be performed which had not previously been scheduled).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus comprising:
    processing circuitry; and
    a scheduler to:
        receive function calls from one or more sources prior to the function calls being scheduled for processing by the processing circuitry;
        maintain a queue of unscheduled function calls;
        identify, for every function call in the queue, a target time window within which the processing circuitry should process the function calls;
        schedule processing of the function calls in the queue by the processing circuitry based on the target time window identified for the function calls in the queue; and
    the processing circuitry to process the function calls based on the schedule.

2. The data processing apparatus according to claim 1, wherein the scheduler is configured to infer a priority of a function call from the target time window identified for the function call.

3. The data processing apparatus according to claim 1, wherein the scheduler is configured to prioritize between function calls based on the target time window identified for the function calls in the queue.

4. The data processing apparatus according to claim 1, wherein the scheduler is configured to determine an order in which function calls in the queue are to be processed by the processing circuitry based on the target time window identified for the function calls in the queue.

5. The data processing apparatus according to claim 1, wherein if the queue includes a group of function calls which cannot all be processed within their respective target time windows, then the scheduler is configured to determine which of said group of function calls should be processed outside its target time window based on the target time window identified for each function call of said group of function calls.

6. The data processing apparatus according to claim 5, wherein the scheduler is configured to determine a lateness metric for said group of function calls which is dependent on the amount of time by which each function call of the group is processed outside its target time window, and
the scheduler is configured to reorder the group of function calls to improve said lateness metric.

7. The data processing apparatus according to claim 1, wherein the scheduler is configured to determine, based on the target time window identified for at least two function calls, whether to coalesce said at least two function calls to reduce an overall time for which the processing circuitry is active or to reduce an overall measure of energy consumption by the processing circuitry.

8. The data processing apparatus according to claim 7, wherein the scheduler is configured to coalesce said at least two function calls if said at least two function calls can be coalesced while still processing each of the at least two function calls within their respective target time windows.

9. The data processing apparatus according to claim 1, wherein the scheduler is configured to identify the target time window for a function call based on window defining information associated with the function call.

10. The data processing apparatus according to claim 9, wherein for at least one function call, the window defining information is provided by a caller making the function call.

11. The data processing apparatus according to claim 9, wherein for at least one function call, the window defining information comprises information previously registered with the scheduler for that function call.

12. The data processing apparatus according to claim 9, wherein the window defining information comprises a window end time representing the latest time at which it is acceptable for the processing circuitry to process the function call.

13. The data processing apparatus according to claim 12, wherein the window defining information also comprises a window start time indicating the earliest time at which it is acceptable for the processing circuitry to process the function call.

14. The data processing apparatus according to claim 9, wherein the window defining information comprises a target processing time representing a preferred time at which the processing circuitry should process the function call, and tolerance information representing how much earlier or later than the target processing time it is acceptable for the processing circuitry to process the function call.

15. The data processing apparatus according to claim 9, wherein the scheduler is configured to set the target time window for at least one function call which is not associated with any window defining information.

16. The data processing apparatus according to claim 1, wherein the scheduler is configured to maintain a plurality of queues of function calls to be scheduled for processing by the processing circuitry; and
the scheduler is configured to identify the target time window for every function call in at least one of the plurality of queues, and to schedule processing of the function calls in said at least one of the plurality of queues based on the target time window for the function calls.

17. The data processing apparatus according to claim 1, wherein the processing circuitry comprises a plurality of processors and the queue of function calls comprises function calls for processing by different ones of said plurality of processors.

18. The data processing apparatus according to claim 1, wherein the scheduler comprises software executed by the processing circuitry.

19. The data processing apparatus according to claim 18, wherein the scheduler comprises part of an operating system executed by the processing circuitry.

20. The data processing apparatus according to claim 1, wherein the data processing apparatus comprises a wearable processing device.

21. A data processing apparatus comprising:
processing means for performing data processing; and
scheduling means for:
receiving function calls from one or more sources prior to the function calls being scheduled for processing by the processing means;
maintaining a queue of unscheduled function calls;
identifying, for every function call in the queue, a target time window within which the processing means should process the function call;
scheduling processing of the function calls in the queue by the processing means based on the target time window identified for the function calls in the queue; and
the processing means to process the function calls based on the schedule.

22. A function call scheduling method for a scheduler of a data processing apparatus, comprising steps of:
receiving function calls from one or more sources prior to the function calls being scheduled for processing by the processing circuitry;
maintaining a queue of unscheduled function calls;
identifying for every function call in the queue a target time window within which the processing circuitry should process the function calls; and
scheduling processing of the function calls in the queue by the processing circuitry based on the target time window identified for the function calls in the queue.

* * * * *